(12) United States Patent
Han et al.

(10) Patent No.: US 11,037,600 B2
(45) Date of Patent: Jun. 15, 2021

(54) VIDEO PROCESSING METHOD AND APPARATUS, TERMINAL AND MEDIUM

(71) Applicant: BEIJING MICROLIVE VISION TECHNOLOGY CO., LTD, Beijing (CN)

(72) Inventors: Xu Han, Beijing (CN); Haiting Wang, Beijing (CN); Pingfei Fu, Beijing (CN)

(73) Assignee: Beijing Microlive Vision Technology Co., Ltd., Beijing (CN)

( * ) Notice: Subject to any disclaimer, the term of this patent is extended or adjusted under 35 U.S.C. 154(b) by 0 days.

(21) Appl. No.: 17/021,245

(22) Filed: Sep. 15, 2020

(65) Prior Publication Data

US 2020/0411053 A1    Dec. 31, 2020

Related U.S. Application Data

(63) Continuation of application No. PCT/CN2018/124784, filed on Dec. 28, 2018.

(30) Foreign Application Priority Data

Sep. 30, 2018   (CN) .......................... 201811162074.X

(51) Int. Cl.
  *G11B 27/00*  (2006.01)
  *G11B 27/034*  (2006.01)
  *G11B 27/34*  (2006.01)

(52) U.S. Cl.
  CPC .......... *G11B 27/005* (2013.01); *G11B 27/034* (2013.01); *G11B 27/34* (2013.01)

(58) Field of Classification Search
  CPC ............................. G11B 27/005; G11B 27/34
  See application file for complete search history.

(56) References Cited

U.S. PATENT DOCUMENTS 9,838,731 B1    12/2017  Matias
2015/0302889 A1  10/2015  Chung et al.
2018/0341705 A1*  11/2018  Kim ..................... G06F 16/739

FOREIGN PATENT DOCUMENTS

CN        101710945 A     5/2010
CN        105307028 A     2/2016
                (Continued)

OTHER PUBLICATIONS

International Search Report and Written Opinion dated Jun. 14, 2019 for PCT Patent Application No. PCT/CN2018/124784.
(Continued)

*Primary Examiner* — Girumsew Wendmagegn
(74) *Attorney, Agent, or Firm* — Thomas Horstemeyer, LLP

(57) ABSTRACT

Disclosed are a video processing method and apparatus, a terminal and a medium. The method includes acquiring a first editing parameter of a playback speed of a continuous video and a second editing parameter of a playback speed of each of at least one target video segment, where the continuous video is synthesized from at least two video segments and the at least one target video segment includes at least one of the at least two video segments; calculating a target playback speed of each of the at least two video segments according to the first editing parameter and the second editing parameter corresponding to the each of the at least one target video segment; and synthesizing, based on the target playback speed of the each of the at least two video segments, the at least two video segments into a target video conforming to a preset duration.

15 Claims, 3 Drawing Sheets

(56) References Cited

FOREIGN PATENT DOCUMENTS

| CN | 105959678 A | 9/2016 |
| CN | 106804002 A | 6/2017 |
| CN | 107256117 A | 10/2017 |
| CN | 108521866 A | 9/2018 |

OTHER PUBLICATIONS

1st Office Action dated May 17, 2019 for Chinese Patent Application No. 201811162074.X.
Peng Taile; et al. "Video classification based on time series contextual information." Computer Engineering and Applications, 2014, 50 (9) : 103-106.

* cited by examiner

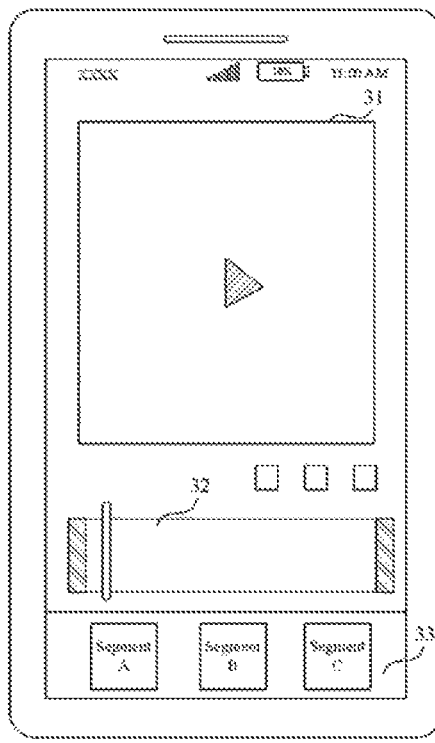

FIG. 3

```
Acquire a first editing parameter of the playback speed of a continuous video
and a second editing parameter of the playback speed of each target video
segment of at least one target video segment, where the continuous video is      S210
synthesized from at least two video segments, and the at least one target video
segment includes at least one video segment of the at least two video segments
```
↓
```
Perform a logical operation on the first editing parameter and the second editing
parameter corresponding to each target video segment, and use the result of the    S220
logical operation as the target playback speed of each target video segment
```
↓
```
Use the first editing parameter as the target playback speed of video segments
in the at least two video segments other than the at least one target video        S230
segment
```
↓
```
Synthesize, based on the target playback speed of each video segment, the at
least two video segments into a target video conforming to a preset duration       S240
```

FIG. 4

VIDEO PROCESSING METHOD AND APPARATUS, TERMINAL AND MEDIUM

CROSS REFERENCE TO RELATED APPLICATIONS

This is continuation of International Patent Application No. PCT/CN2018/124784, filed on Dec. 28, 2018, which is based on and claims priority to Chinese Patent Application No. 201811162074.X filed with the CNIPA on Sep. 30, 2018, disclosures of which are incorporated herein by reference in their entireties.

TECHNICAL FIELD

The present disclosure relates to the technical field of the Internet, for example, to a video processing method and apparatus, a terminal and a medium.

BACKGROUND

With the development of network technology, video interactive applications are popular in people's daily life.

For an Internet enterprise of video interactive applications, satisfying user requirements and providing users with satisfactory product experience are key factors that cannot be ignored in maintaining the competitiveness of the enterprise. For a wide range of user groups, video interactive applications can provide users with a variety of video resources, such as funny resources, humorous resources, scientific resources, current affairs and life resources. With video interactive applications, users can shoot videos of different styles anywhere anytime, add various special effects and set different types of background music.

However, loss of information in a video easily occurs while video interactive application software is editing the video for multiple times in the related art.

SUMMARY

The present disclosure provides a video processing method and apparatus, a terminal and a medium to avoid loss of information during video editing.

An embodiment of the present disclosure provides a video processing method. The method includes acquiring a first editing parameter of a playback speed of a continuous video and a second editing parameter of a playback speed of each of at least one target video segment, where the continuous video is synthesized from at least two video segments and the at least one target video segment includes at least one of the at least two video segments; calculating a target playback speed of each of the at least two video segments according to the first editing parameter and the second editing parameter corresponding to the each of the at least one target video segment; and synthesizing, based on the target playback speed of the each of the at least two video segments, the at least two video segments into a target video conforming to a preset duration.

An embodiment of the present disclosure further provides a video processing apparatus. The apparatus includes an editing operation acquisition module, a video segment editing module and a video synthesis module.

The editing operation acquisition module is configured to acquire a first editing parameter of a playback speed of a continuous video and a second editing parameter of a playback speed of each of at least one target video segment. The continuous video is synthesized from at least two video segments and the at least one target video segment comprises at least one of the at least two video segments.

The video segment editing module is configured to calculate a target playback speed of each of the at least two video segments according to the first editing parameter and the second editing parameter corresponding to the each of the at least one target video segment.

The video synthesis module is configured to synthesize, based on the target playback speed of the each of the at least two video segments, the at least two video segments into a target video conforming to a preset duration.

An embodiment of the present disclosure further provides a terminal. The terminal includes at least one processor; and a memory configured to store at least one program.

When executed by the at least one processor, the at least one program causes the at least one processor to perform the video processing method as described in any embodiment of the present disclosure.

An embodiment of the present disclosure further provides a computer-readable storage medium.

The computer-readable storage medium stores at least one computer program which, when executed by at least one processor, causes the at least one processor to perform the video processing method as described in any embodiment of the present disclosure.

According to embodiments of the present disclosure, a first editing parameter of the playback speed of a continuous video synthesized from at least two video segments and a second editing parameter of the playback speed of at least one video segment of the at least two video segments are acquired, the target playback speed of each video segment is calculated, and then a target video is synthesized based on the target playback speed of each video segment. This solves the problem in which information is easy to lose in a video editing process, avoids the loss of video information and improves the user experience in synthesizing video segments into a complete video and sharing the video. Moreover, a video interactive application can be used for video editing operations, simplifying the video editing process, reducing the difficulty and complexity of video editing and improving the convenience of video editing.

BRIEF DESCRIPTION OF DRAWINGS

FIG. 3 is a schematic diagram of a video editing interface provided with a video preview area according to an embodiment of the present disclosure.

FIG. 4 is a flowchart of another video processing method according to an embodiment of the present disclosure.

DETAILED DESCRIPTION

Figure 1:
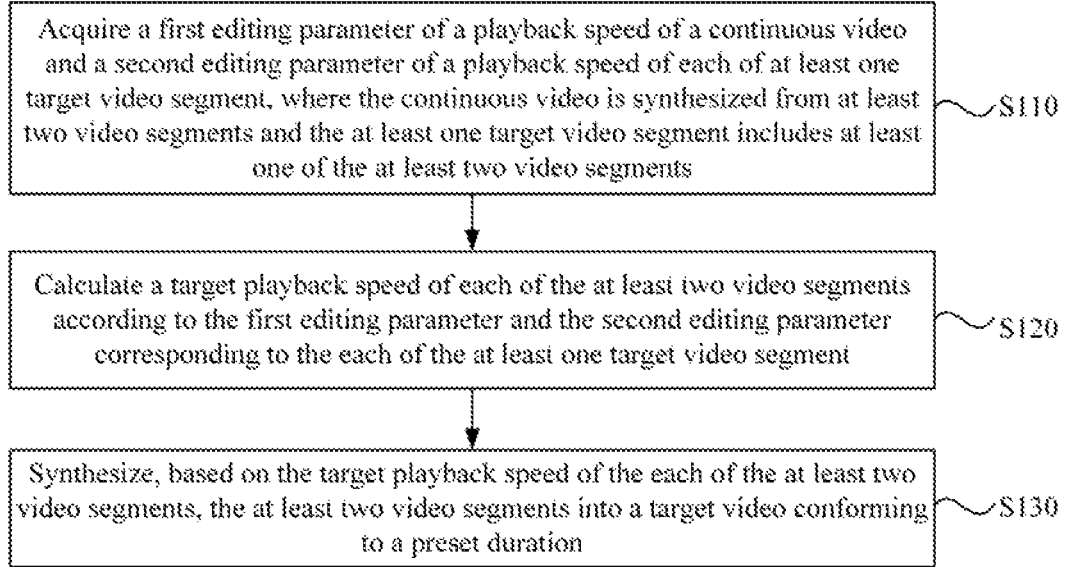
FIG. 1 is a flowchart of a video processing method according to an embodiment of the present disclosure.

The present disclosure is described below with reference to the drawings and embodiments. The embodiments described herein are intended only to explain the present disclosure and not to limit the present disclosure. In addition, for ease of description, only some, rather than all, of the structures associated with the present disclosure are shown in the drawings.

Embodiment

FIG. 1 is a flowchart of a video processing method according to an embodiment of the present disclosure. This embodiment is applicable to the case of video processing, for example, playback speed editing for multiple times in a video synthesis process. The method may be executed by a video processing apparatus. The apparatus may be implemented by software and/or hardware, and may be configured on any terminal having a network communication function, for example, a smartphone, a computer or an ipad.

As shown in FIG. 1, the video processing method provided in this embodiment of the present disclosure may include the steps described below.

In S110, a first editing parameter of the playback speed of a continuous video and a second editing parameter of the playback speed of each target video segment of at least one target video segment. The continuous video is synthesized from at least two video segments, and the at least one target video segment includes at least one video segment of the at least two video segments.

In video synthesis using a video interactive application, a user selects, through the video selection interface of the video interactive application, video segments for video synthesis. The video segments are video resources local to the user terminal. The video interactive application detects the video selection operation of the user and then acquires, in real time, the video segments selected by the user. When the selection operation of the video segments by the user is completed, the video interactive application may be switched from the video selection interface to a video editing interface. On the video editing interface, the user may perform the editing operation of the playback speed with each video segment as an edited object or with a preliminarily synthesized continuous video as an edited object. After editing, the editing effect can be previewed. The editing parameter of the playback speed acquired by the terminal is used for describing the editing operation performed by the user, including the correspondence between the editing operation and the edited object (continuous video or video segment) and editing of the speed value. In an embodiment, on the video editing interface, the user may further perform at least one of editing operations of clipping, resolution editing, rotation of a played picture, video deletion, or adding a display effect.

Figure 2:
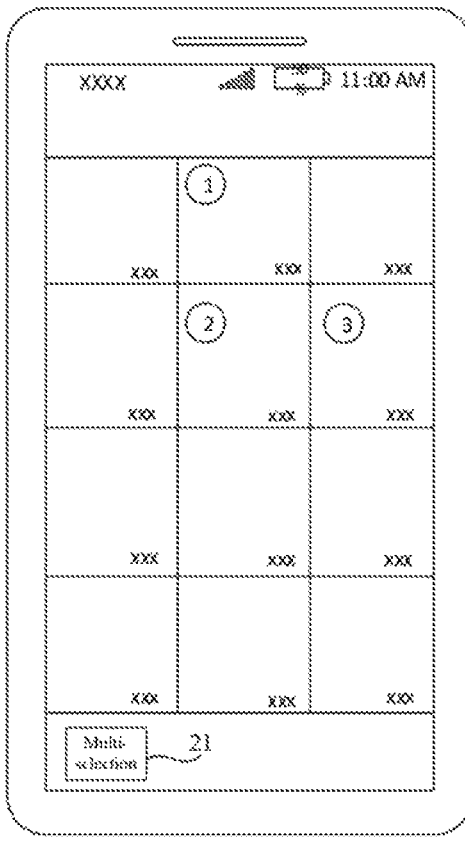
FIG. 2 is a schematic diagram of a video selection interface according to an embodiment of the present disclosure.

As an example, FIG. 2 shows a schematic diagram of a video selection interface according to an embodiment of the present disclosure. As an example, FIG. 3 shows a schematic diagram of a video editing interface provided with a video preview area according to an embodiment of the present disclosure. The video editing interface may be switched to from the video selection interface. As shown in FIG. 3, the video editing interface includes a video preview area 31, a video clipping area 32 and a video segment area 33. The video preview area 31 is used for previewing a video editing effect in a video editing process, such as the editing effect of a preliminarily synthesized continuous video or the editing effect of a single video segment. The handles on the left and right sides of the video clipping area 32 move as the user drags the handles to adjust the video duration of the preview. The pointer within the video clipping area 32 moves as the previewed video is played. The video segment area 33 shows a plurality of video segments selected by the user. All the video segments selected by the user can be viewed by sliding left and right in the video segment area 33. The edge of the video editing interface or the gap between the video preview area 31 and the video clipping area 32 may be provided with editing controls, such as a clipping control, a playback speed editing control and a resolution editing control.

In this embodiment, there is no strict sequence between the editing operation corresponding to the first editing parameter of the playback speed and the editing operation corresponding to the second editing parameter of the playback speed. That is, the user can perform the overall editing operation on the continuous video and the individual editing operation on a single video segment in any order.

In S120, the target playback speed of each video segment is calculated according to the first editing parameter and according to the second editing parameter corresponding to each target video segment.

The video interactive application acquires the first editing parameter and the second editing parameter corresponding to each target video segment. The video interactive application may calculate the final playback speed of each video segment, that is, the target playback speed, by calculating and classifying the editing parameters and matching each editing operation with the corresponding video segment.

In S130, based on the target playback speed of each video segment, at least two video segments are synthesized into a target video satisfying a preset duration.

After the playback speed is edited for multiple times so that the target playback speed of each video segment is obtained, the playback speed of each video segment is edited once based on the original video data of each video segment, and then a target video whose duration is greater than or equal to a preset video duration is synthesized based on the edited video segments.

In an embodiment, the duration of the continuous video is greater than or equal to the duration of the target video. That is, the continuous video is equivalent to a transitional intermediate video file, and the user can perform the editing operation based on the continuous video to obtain the target video. For example, if the duration of the continuous video is greater than the preset duration, a target video satisfying the duration requirement can be obtained by video clipping.

In addition, since the video interactive application can be used for a variety of video editing operations, such as playback speed editing, the user does not need to additionally use other video synthesis tools in the video synthesis process, such as a third-party application for video synthesis. Thus, it is possible to simplify the video editing process, reduce the difficulty and complexity of video editing and improve the convenience of video editing.

In an embodiment, based on the preceding solution, the method further includes acquiring the selected at least two video segments in response to a video multi-selection request triggered on a video selection interface. The video selection interface is an interface which is switched from a video capture interface or a detail interface. In an embodiment, the video selection interface is displayed by a user triggering a specific identifier of a video capture interface or a detail interface. The detail interface includes a detail interface of other information, such as an audio detail interface and a video detail interface.

That is, after the user enables the video interactive application on the terminal, it is feasible to trigger the specific identifier of the video capture interface or the detail interface of the video interactive application, such as an uploading identifier or a sharing identifier, to switch from the current interface to the video selection interface. The video selection interface can synchronously display video segments local to the terminal to facilitate user selection. In an embodiment, if the video selection interface is switched to from a music detail interface, the user may use the audio of the music detail interface as the background music of the synthesized video.

After the user triggers the video multi-selection request, while acquiring information about the video segments selected by the user, the video interactive application records the selection order in which the user selects the video segments so that the video can be synthesized based on the selection order of the user. In this embodiment, the video may be synthesized in an arrangement order of the video segments customized by the user.

During user selection, the user may touch the position of a video thumbnail on the video selection interface to preview the video to determine whether to select the video segment. In an embodiment, the duration of a user-selected video segment is greater than or equal to a duration threshold. That is, the duration threshold determines a valid video segment selectable by the user. Exemplarily, the duration threshold is set to 3 seconds. When the duration of video segment a selected by the user is 2 seconds, a prompt box (toast) may pop up to indicate that video segment a selected by the user is invalid and needs to be reselected. The number of user-selectable video segments may be adaptively set, for example, may be set to 12. The number of user-selectable video segments is not limited in this embodiment. Other video thumbnails on the video selection interface may cover the white masked layer and may no longer support user selection when the number of video segments selected by the user reaches a required preset number.

As shown in FIG. 2, a multi-selection control 21 is disposed on the video selection interface. After the user triggers the video multi-selection request, each time a video segment is selected, as the recording information of the video segment selected by the user, a number is displayed in the upper left corner of the video thumbnail corresponding to the video segment. In this embodiment, the multi-selection control 21 may be disposed at any position at the edge of the interface. In FIG. 2, the multi-select control 21 is exemplarily disposed at the lower left.

In the video synthesis process, in addition to playback speed editing, at least one of editing operations of clipping, resolution editing, rotation of a played picture, video deletion, or adding a display effect may be performed for the video. The preceding editing operation involves overall editing of a synthesized continuous video as an edited object and individual editing of each video segment as an edited object. Video editing effects, including the playback speed editing effect, can all be displayed to the user through the video preview area of the video editing interface. That is, after the video editing operation of the user is finished, the video interactive application generates the video preview effect corresponding to the editing operation so that the user can preview the video and save the video in the buffer of the terminal.

According to embodiments of the present disclosure, a first editing parameter of the playback speed of a preliminarily synthesized continuous video and a second editing parameter of the playback speed of at least one video segment are acquired, the target playback speed of each video segment is calculated according to the first editing parameter and the second editing parameter, and then a target video is synthesized based on the target playback speed of each video segment. This solves the problem in which information is easy to lose in a video editing process. The mode of editing the playback speed always based on the original video segments avoids the loss of video information and thus improves the user experience in synthesizing video segments into a complete video and sharing the video. Moreover, since the video interactive application can be used for a variety of video editing operations, it is not needed to use additional professional video synthesis tools in the process of synthesizing the video, thereby improving the convenience of video editing and reducing the difficulty and complexity of video editing.

FIG. 4 is a flowchart of another video processing method according to an embodiment of the present disclosure. The following gives a description based on the preceding embodiments.

As shown in FIG. 4, the video processing method provided in this embodiment of the present disclosure may include the steps described below.

In S210, a first editing parameter of the playback speed of a continuous video and a second editing parameter of the playback speed of each target video segment of at least one target video segment are acquired. The continuous video is synthesized from at least two video segments, and the at least one target video segment includes at least one video segment of the at least two video segments.

In S220, a logical operation is performed on the first editing parameter and the second editing parameter corresponding to each target video segment, and the result of the logical operation is used as the target playback speed of each target video segment.

The overall editing of the playback speed of the continuous video by the user is equivalent to the same editing operation of the playback speed of all video segments contained in the continuous video. Thus, a logical AND operation is performed on the first editing parameter and the second editing parameter according to the correspondence between the playback speed and each video segment so that the result of the logical AND operation of the playback speed corresponding to each video segment can be obtained, and subsequently the video segments can be edited one by one according to the original video data of the video segments.

Exemplarily, for video segments A and B, the user first adjusts the playback speed of continuous video C preliminarily synthesized from video segments A and B to ⅓ the original speed and then adjusts the playback speed of video segment A individually to twice the original speed. The video interactive application records the speed increase editing operation of continuous video C by the user and the speed reduction editing operation of video segment A by the user. Through the logical operation of the editing operations, after two editing operations, the target playback speed of video segment A is ⅔ the original playback speed of video segment A and the target playback speed of video segment B is ⅓ the original playback speed of video segment B. Then, based on the original video data of video segment A and the original video data video segment B, the target playback speed of video segment A and the target playback speed of video segment B are adjusted to ⅔ the original playback speed of video segment A and ⅓ the original playback speed of video segment B respectively. In the related art, in the above case, the final playback speed of video segment A is obtained not based on the original video data of video segment A, but in such manner: The playback speed of video segment A is re-edited based on the effect corresponding to the first editing operation, that is, the playback speed of video segment A is adjusted to twice the ⅓ of the original playback speed of video segment A. It can be seen that the method of this embodiment not only avoids the loss of video information, but also avoids the accumulation of the degree of information loss in the process of editing for multiple times, so that the fidelity of the video data is higher.

In S230, the first editing parameter is used as the target playback speed of video segments except the at least one target video segment in the at least two video segments.

Video segments included in the continuous video are not all re-edited in terms of the playback speed. The target playback speed of a video segment whose playback speed is edited only once is the playback speed of the edited continuous video. In this embodiment, there is no strict limitation on the execution sequence of operation S220 and operation S230. This embodiment is not limited to the exemplary execution sequence shown in FIG. 2.

In an embodiment, the target playback speed of each video segment includes the playback speed of image data in each video segment and the playback speed of audio data in each video segment. The logical operation of the editing parameters in this embodiment is applicable to both the image data in the video and the audio data in the video so that the loss of both the image data and the audio data in the video editing process can be avoided.

In S240, based on the target playback speed of each video segment, the at least two video segments are synthesized into a target video conforming to a preset duration.

A target video whose duration is greater than or equal to the preset video duration can be synthesized after the target playback speed obtained by playback speed editing for multiple times is determined based on the original video of each video segment.

According to embodiments of the present disclosure, based on a first editing parameter of the acquired continuous video and a second editing parameter corresponding to each target video segment, first a logical operation is performed on the first editing parameter and the second editing parameter so that the target playback speed of each target video segment is obtained, the first editing parameter is used as the target playback speed of video segments except target video segments, and then a target video is synthesized based on the target playback speed. This solves the problem in which information is easy to lose in a video editing process. The mode of editing the playback speed is always based on the original video segments avoids the loss of video information and thus improves the user experience in synthesizing video segments into a complete video and sharing the video and improves the convenience of video editing.

Figure 5:
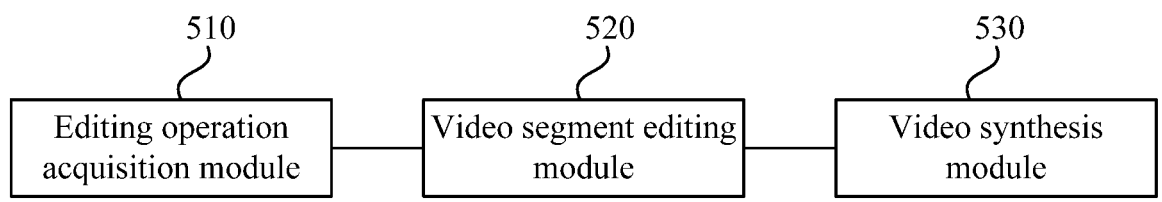
FIG. 5 is a structure diagram of a video processing apparatus according to an embodiment of the present disclosure.

FIG. 5 is a structure diagram of a video processing apparatus according to an embodiment of the present disclosure. This embodiment is applicable to the case of video processing, for example, playback speed editing for multiple times in a video synthesis process. The video processing apparatus may be implemented by software and/or hardware and may be configured on any terminal having a network communication function.

As shown in FIG. 5, the video processing apparatus provided in this embodiment of the present disclosure may include an editing operation acquisition module 510, a video segment editing module 520 and a video synthesis module 530. The editing operation acquisition module 510 is configured to acquire a first editing parameter of a playback speed of a continuous video and a second editing parameter of a playback speed of each of at least one target video segment. The continuous video is synthesized from at least two video segments and the at least one target video segment includes at least one of the at least two video segments. The video segment editing module 520 is configured to calculate a target playback speed of each of the at least two video segments according to the first editing parameter and the second editing parameter corresponding to the each of the at least one target video segment. The video synthesis module 530 is configured to synthesize, based on the target playback speed of the each of the at least two video segments, the at least two video segments into a target video conforming to a preset duration.

In an embodiment, the video segment editing module 520 includes a first video segment editing unit and a second video segment editing unit. The first video segment editing unit is configured to perform a logical operation on the first editing parameter and the second editing parameter corresponding to the each of the at least one target video segment, and use a result of the logical operation as a target playback speed of the each of the at least one target video segment. The second video segment editing unit is configured to use the first editing parameter as a target playback speed of video segments except the at least one target video segment in the at least two video segments.

In an embodiment, the target playback speed of each video segment includes the playback speed of image data in each video segment and the playback speed of audio data in each video segment.

In an embodiment, the apparatus further includes a video segment acquisition module. The video segment acquisition module is configured to acquire the selected at least two video segments in response to a video multi-selection request triggered on a video selection interface. The video selection interface is an interface which is switched from a video capture interface or a detail interface.

In an embodiment, the duration of the continuous video is greater than or equal to the duration of the target video.

The video processing apparatus may perform the video processing method provided in any embodiment of the present disclosure and may have function modules and beneficial effects corresponding to the video processing method.

Embodiment

Figure 6:
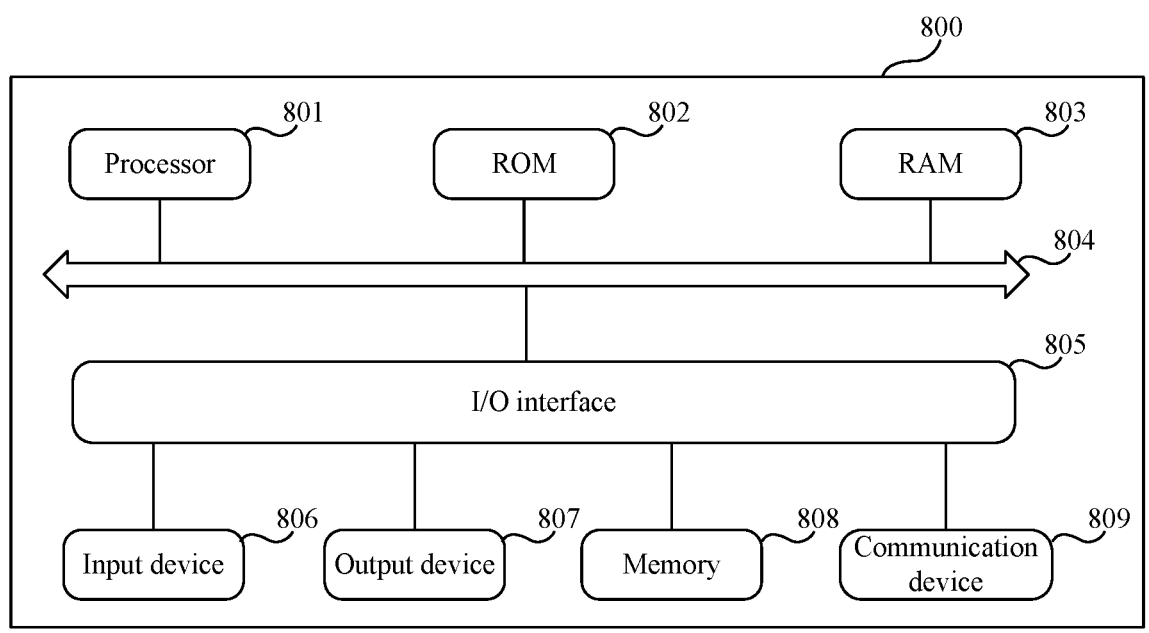
FIG. 6 is a schematic diagram of a hardware structure of a terminal according to an embodiment of the present disclosure.

FIG. 6 is a schematic diagram of a hardware structure of a terminal according to an embodiment of the present disclosure. Referring to FIG. 6, FIG. 6 shows a structure diagram of a terminal 800 suitable for implementing embodiments of the present disclosure. The terminal in each embodiment of the present disclosure may include, but is not limited to, a mobile terminal such as a mobile phone, a notebook computer, a digital broadcast receiver, a personal digital assistant (PDA), a portable Android device (PAD), a portable media player (PMP) or a vehicle-mounted terminal (for example, a vehicle-mounted navigation terminal) or a fixed terminal such as a digital television (TV) or a desktop computer. The terminal shown in FIG. 6 is merely an example not intended to limit the functionality and scope of use of embodiments of the present disclosure.

As shown in FIG. 6, the terminal 800 may include one or more processors (for example, a central processing unit and a graphics processing unit) 801 and a memory 808 configured to store one or more programs. The processor 801 may execute at least one appropriate action or processing according to one or more programs stored in a read-only memory (ROM) 802 or one or more programs loaded into a random access memory (RAM) 803 from the memory 808. The RAM 803 is further configured to store at least one program and data required for the operation of the terminal 800. The processor 801, the ROM 802 and the RAM 803 are connected to each other by a bus 804. An input/output (I/O) interface 805 is also connected to the bus 804.

Generally, devices that can be connected to the I/O interface 805 include an input device 806 such as a touch screen, a touch pad, a keyboard, a mouse, a camera, a microphone, an accelerometer and a gyroscope; an output device 807 such as a liquid crystal display (LCD), a speaker and a vibrator; the memory 808 such as a magnetic tape and a hard disk; and a communication device 809. The communication device 809 allows the terminal 800 to wirelessly or wiredly communicate with other devices to exchange data. Although FIG. 6 shows that the terminal 800 has various devices, the terminal 800 is not required to implement or have all of the devices shown. The terminal 800 may alternatively implement or have more or fewer devices.

According to embodiments of the present disclosure, the process described above with reference to the flowchart may be implemented as a computer software program. For example, this embodiment of the present disclosure includes a computer program product. The computer program product includes a computer program carried in a computer-readable medium. The computer program contains program codes for implementation of the method shown in the flowchart. In such an embodiment, the computer program may be downloaded and installed from the network through the communication device 809, installed from the memory 808, or installed from the ROM 802. When the computer program is executed by the processor 801, the functions defined in the method of any one of embodiments of the present disclosure are performed.

The computer-readable medium described above in the present disclosure may be a computer-readable signal medium, a computer-readable storage medium or a combination of any of the two. The computer-readable storage medium may be, for example, but not limited to, an electrical, magnetic, optical, electromagnetic, infrared or semiconductor system, device or element, or a combination of any of the above. More examples of the computer-readable storage medium may include, but are not limited to, an electrical connection having one or more wires, a portable computer disk, a hard disk, a RAM, a ROM, an erasable programmable read-only memory (EPROM), an optical fiber, a compact disc read-only memory (CD-ROM), an optical storage device, a magnetic storage device, or a suitable combination of any of the foregoing. In the present disclosure, the computer-readable storage medium may be any tangible medium containing or storing a program that may be used by or used in connection with an instruction execution system, device or element. In the present disclosure, the computer-readable signal medium may include a data signal propagated as part of a carrier wave or in a baseband, and the computer-readable signal medium carries computer-readable program codes. Such propagated data signal may take a variety of forms including, but not limited to, an electromagnetic signal, an optical signal, or a suitable combination of any of the foregoing. The computer-readable signal medium may also be any computer-readable medium except a computer-readable storage medium. The computer-readable signal medium may send, propagate or transmit a program that may be used by or used in connection with an instruction execution system, device or element.

The program codes included in the computer-readable medium may be transmitted using any suitable medium including, but not limited to, a wire, an optical cable, a radio frequency (RF), or a suitable combination of any of the foregoing.

The computer-readable medium may be included in the terminal, or may be present alone and not mounted in the terminal.

The computer-readable medium carries one or more programs which, when executed by the terminal, cause the terminal to acquire a first editing parameter of a playback speed of a continuous video and a second editing parameter of a playback speed of each of at least one target video segment, where the continuous video is synthesized from at least two video segments and the at least one target video segment includes at least one of the at least two video segments; to calculate a target playback speed of each of the at least two video segments according to the first editing parameter and the second editing parameter corresponding to the each of the at least one target video segment; and to synthesize, based on the target playback speed of the each of the at least two video segments, the at least two video segments into a target video conforming to a preset duration.

Computer program codes for implementation of the operations of the present disclosure may be written in one or more programming languages or in a combination of multiple programming languages. The languages include object-oriented programming languages such as Java, Smalltalk and C++ or conventional procedural programming languages such as or "C" language or a similar programming language. The program codes may be executed entirely on a user computer, partly on the user computer, as a separate software package, partly on the user computer and partly on a remote computer, or entirely on the remote computer or a server. In the case involving the remote computer, the remote computer may be connected to the user computer through any type of network including a local area network (LAN) or a wide area network (WAN) or may be connected to an external computer (by using, for example, the Internet of an Internet service provider).

Flowcharts and block diagrams in the drawings illustrate architectures, functions and operations of possible implementations of systems, methods and computer program products according to embodiments of the present disclosure. In this regard, each block in the flowcharts or the block diagrams may represent a module, a program segment, or a part of codes that contain one or more executable instructions for implementing a specified logical function. Each block of the block diagrams and/or the flowcharts and a combination of blocks in the block diagrams and/or the flowcharts may be implemented by a dedicated hardware-based system for performing specified functions or operations or may be implemented by a combination of dedicated hardware and computer instructions.

The units described in embodiments of the present disclosure may be implemented by software or hardware. In some cases, the name of a unit does not limit the unit.

What is claimed is:
1. A video processing method comprising:
 acquiring a first editing parameter of a playback speed of a continuous video and a second editing parameter of a playback speed of each of at least one target video segment, wherein the continuous video is synthesized from at least two video segments and the at least one target video segment comprises at least one of the at least two video segments;
 calculating a target playback speed of each of the at least two video segments according to the first editing parameter and the second editing parameter corresponding to the each of the at least one target video segment; and synthesizing, based on the target playback speed of the each of the at least two video segments, the at least two video segments into a target video conforming to a preset duration;

wherein calculating the target playback speed of the each of the at least two video segments according to the first editing parameter and the second editing parameter corresponding to the each of the at least one target video segment comprises:

performing a logical operation on the first editing parameter and the second editing parameter corresponding to the each of the at least one target video segment, and using a result of the logical operation as a target playback speed of the each of the at least one target video segment; and using the first editing parameter as a target playback speed of video segments except the at least one target video segment in the at least two video segments.

2. The method of claim 1, wherein the target playback speed of the each of the at least two video segments comprises a playback speed of image data in the each of the at least two video segments and a playback speed of audio data in the each of the at least two video segments.

3. The method of claim 1, wherein the target playback speed of the each of the at least two video segments comprises a playback speed of image data in the each of the at least two video segments and a playback speed of audio data in the each of the at least two video segments.

4. The method of claim 1, further comprising:
acquiring the at least two video segments selected in response to a video multi-selection request triggered on a video selection interface, wherein the video selection interface is an interface which is switched from a video capture interface or a detail interface.

5. The method of claim 1, further comprising:
acquiring the at least two video segments selected in response to a video multi-selection request triggered on a video selection interface, wherein the video selection interface is an interface which is switched from a video capture interface or a detail interface.

6. The method of claim 2, further comprising:
acquiring the at least two video segments selected in response to a video multi-selection request triggered on a video selection interface, wherein the video selection interface is an interface which is switched from a video capture interface or a detail interface.

7. The method of claim 1, wherein a duration of the continuous video is greater than or equal to a duration of the target video.

8. A terminal comprising:
at least one processor; and
a memory configured to store at least one program,
wherein when executed by the at least one processor, the at least one program causes the at least one processor to perform:
acquiring a first editing parameter of a playback speed of a continuous video and a second editing parameter of a playback speed of each of at least one target video segment, wherein the continuous video is synthesized from at least two video segments and the at least one target video segment comprises at least one of the at least two video segments;
calculating a target playback speed of each of the at least two video segments according to the first editing parameter and the second editing parameter corresponding to the each of the at least one target video segment; and synthesizing, based on the target playback speed of the each of the at least two video segments, the at least two video segments into a target video conforming to a preset duration;

wherein the at least one program causes the at least one processor to perform calculating a target playback speed of each of the at least two video segments according to the first editing parameter and the second editing parameter corresponding to the each of the at least one target video segment by:

performing a logical operation on the first editing parameter and the second editing parameter corresponding to the each of the at least one target video segment, and using a result of the logical operation as a target playback speed of the each of the at least one target video segment; and using the first editing parameter as a target playback speed of video segments except the at least one target video segment in the at least two video segments.

9. The terminal of claim 8, wherein the target playback speed of the each of the at least two video segments comprises a playback speed of image data in the each of the at least two video segments and a playback speed of audio data in the each of the at least two video segments.

10. The terminal of claim 8, the at least one program causes the at least one processor to further perform:
acquiring the at least two video segments selected in response to a video multi-selection request triggered on a video selection interface, wherein the video selection interface is an interface which is switched from a video capture interface or a detail interface.

11. The terminal of claim 8, wherein a duration of the continuous video is greater than or equal to a duration of the target video.

12. A non-transitory computer-readable storage medium storing at least one computer program which, when executed by at least one processor, causes the at least one processor to perform:
acquiring a first editing parameter of a playback speed of a continuous video and a second editing parameter of a playback speed of each of at least one target video segment, wherein the continuous video is synthesized from at least two video segments and the at least one target video segment comprises at least one of the at least two video segments;

calculating a target playback speed of each of the at least two video segments according to the first editing parameter and the second editing parameter corresponding to the each of the at least one target video segment; and synthesizing, based on the target playback speed of the each of the at least two video segments, the at least two video segments into a target video conforming to a preset duration;

wherein the at least one program causes the at least one processor to perform calculating a target playback speed of each of the at least two video segments according to the first editing parameter and the second editing parameter corresponding to the each of the at least one target video segment by:

performing a logical operation on the first editing parameter and the second editing parameter corresponding to the each of the at least one target video segment, and using a result of the logical operation as a target playback speed of the each of the at least one target video segment; and using the first editing parameter as a target playback speed of video segments except the at least one target video segment in the at least two video segments.

13. The non-transitory computer-readable storage medium of claim 12, wherein the target playback speed of the each of the at least two video segments comprises a playback speed of image data in the each of the at least two video segments and a playback speed of audio data in the each of the at least two video segments.

14. The non-transitory computer-readable storage medium of claim 12, the at least one program causes the at least one processor to further perform:

acquiring the at least two video segments selected in response to a video multi-selection request triggered on a video selection interface, wherein the video selection interface is an interface which is switched from a video capture interface or a detail interface.

15. The non-transitory computer-readable storage medium of claim 12, wherein a duration of the continuous video is greater than or equal to a duration of the target video.

\* \* \* \* \*